United States Patent
Taveau

(10) Patent No.: US 10,839,365 B2
(45) Date of Patent: Nov. 17, 2020

(54) FINGER PRINT FUNDING SOURCE SELECTION

(75) Inventor: Sebastien Taveau, Redwood City, CA (US)

(73) Assignee: PAYPAL, INC., San Jose, CA (US)

(*) Notice: Subject to any disclaimer, the term of this patent is extended or adjusted under 35 U.S.C. 154(b) by 761 days.

(21) Appl. No.: 13/409,358

(22) Filed: Mar. 1, 2012

(65) Prior Publication Data

US 2013/0232066 A1 Sep. 5, 2013

(51) Int. Cl.
| | |
|---|---|
| G06Q 20/22 | (2012.01) |
| G06Q 20/40 | (2012.01) |
| G06Q 20/32 | (2012.01) |
| G06Q 30/04 | (2012.01) |
| G06Q 40/02 | (2012.01) |

(52) U.S. Cl.
CPC ......... G06Q 20/227 (2013.01); G06Q 20/322 (2013.01); G06Q 20/40145 (2013.01); G06Q 30/04 (2013.01); G06Q 40/02 (2013.01)

(58) Field of Classification Search
CPC .................................................. G06Q 20/227
See application file for complete search history.

(56) References Cited

U.S. PATENT DOCUMENTS

| | | | | |
|---|---|---|---|---|
| 7,697,729 B2* | 4/2010 | Howell | .............. | G06K 9/00013 345/156 |
| 2007/0284432 A1* | 12/2007 | Abouyounes | .......... | G06Q 20/04 235/379 |
| 2008/0010191 A1* | 1/2008 | Rackley, III | ......... | G06Q 20/042 705/39 |
| 2008/0041942 A1* | 2/2008 | Aissa | .................. | G06K 9/00087 235/382 |
| 2009/0044023 A1* | 2/2009 | Crumlin | .............. | G06F 3/03547 713/186 |
| 2010/0306819 A1* | 12/2010 | Nahari | .................. | G06F 21/554 726/2 |
| 2011/0237301 A1* | 9/2011 | Patel | ...................... | G06Q 20/32 455/566 |
| 2011/0314539 A1* | 12/2011 | Horton | .................... | G06F 21/35 726/20 |
| 2012/0084206 A1* | 4/2012 | Mehew | .................. | G06Q 40/00 705/44 |
| 2012/0130885 A1* | 5/2012 | Feiereisen | ............ | G06Q 20/206 705/38 |
| 2012/0197743 A1* | 8/2012 | Grigg | ...................... | G06Q 20/20 705/16 |
| 2012/0310760 A1* | 12/2012 | Phillips | .................. | G06Q 40/02 705/26.1 |
| 2013/0046645 A1* | 2/2013 | Grigg | ...................... | G06Q 30/06 705/26.1 |
| 2013/0205360 A1* | 8/2013 | Novak | .................. | H04L 63/102 726/1 |
| 2013/0232066 A1* | 9/2013 | Taveau | ................. | G06Q 20/227 705/44 |

FOREIGN PATENT DOCUMENTS

DE  202005002694 U1 * 11/2006 ............ H04W 12/06

* cited by examiner

Primary Examiner — Jay Huang
(74) Attorney, Agent, or Firm — Haynes and Boone, LLP

(57) ABSTRACT

Each finger of a user can be uniquely associated with a funding source for a user account with a payment provider, such that the user can select or change a funding source by simply having the desired finger print read, such as on the display of a smart phone.

21 Claims, 4 Drawing Sheets

FINGER PRINT FUNDING SOURCE SELECTION

BACKGROUND

Field of the Invention

The present invention is related generally mobile payments and in particular to selecting funding sources for mobile payments.

Description of Related Art

Mobile devices, such as smart phones, are being used for things well beyond simple phone calls between two people. Smart phones enable a user to access the Internet, store content, take photos and videos, and conduct financial transactions.

Typically, with financial transactions, consumers have a number of different ways or funding sources with which to make a payment or send funds. Those include credit cards, debit cards, a checking account, a savings account, etc. There are generally multiple options even within funding source types. For example, a user may have four different credit card types, Visa, American Express, MasterCard, and Discover. A consumer or user may even have a plurality of cards for a cared type, e.g., a Hilton Honors American Express, a Starwood American Express, etc.

When making a financial transaction, the user may designate a particular funding source. An exemplary flow starts with the user accessing a payment provider service through the user's mobile device, either through an app or mobile web. Once accessed, the user logs in or is otherwise authenticated. Payment details are processed and presented to the user on the mobile device, such as a payment amount and a recipient. A default funding source may also be shown. The user has the option of using the default funding source or select an alternative funding source associated with the user account. One way for the consumer to do this is to select an available funding source from a drop down menu or list, such as by tapping or otherwise selecting the desired funding source from the screen.

However, this method can be problematic and inconvenient, especially with large numbers of funding sources and/or the small screen space available on a mobile device. For example, with, say eight different funding sources, it may be burdensome for the user to identify the desired funding source from a listing. Also, selecting a desired funding source from a small screen can be difficult, as the user may unintentionally select an adjacent funding source. Errors may be increased if the mobile device is not that stable, such as when the user is walking or otherwise moving.

Therefore, there is a need for a user to more easily select a desired funding source on a mobile device.

SUMMARY

According to one embodiment of the present invention, different funding sources are associated with different fingers of a user. When the user wants to change or select a funding source, the user places a finger corresponding to the desired funding source on the mobile device screen or has the finger print read otherwise. The user may be asked to confirm the funding source before the payment is processed.

In one embodiment, the user first registers or selects this type of funding source change method by associating a finger print to a funding source. Funding sources can be anything used to fund or make a payment. Examples include specific credit cards, specific debit cards, checking accounts, savings accounts, payment provider balances or accounts, coupons, gift cards, etc.

When adding a funding source, the may be asked whether the user wants to associate a finger print with the funding source to utilize a quick change option. If so, after details of the funding source have been added, such as type, account number, billing address, security code, expiration date, etc., the user may be asked to place the desired finger against a finger print reader. The reader may be integrated with a user device, such as a mobile phone or PC, a separate reader attached to a user device, or a stand-alone device in communication with the payment provider and/or the user device. Once the finger print has been successfully read, the registration process may be completed. The user can continue having different finger prints associated and read to correspond to additional different funding sources. Note that the finger print registration can be done at any time after a funding source has been added to a payment provider account.

When the ready is ready to make a payment using the payment provider account, the user may be given an option of changing or selecting a funding source. Instead of selecting a drop down menu to view available funding sources and selecting a desired funding source, the user may simply place the finger corresponding to the desired funding source against the mobile device screen. The device may have a finger print reader embedded therein and an active portion of the screen for reading the finger print. Once successfully read, the user may be asked to confirm the selected funding source, such as by tapping or otherwise selecting a button.

As a result, the user is able to quickly and easily select or change a funding source from a mobile device.

These and other features and advantages of the present invention will be more readily apparent from the detailed description of the embodiments set forth below taken in conjunction with the accompanying drawings.

Figure 1:
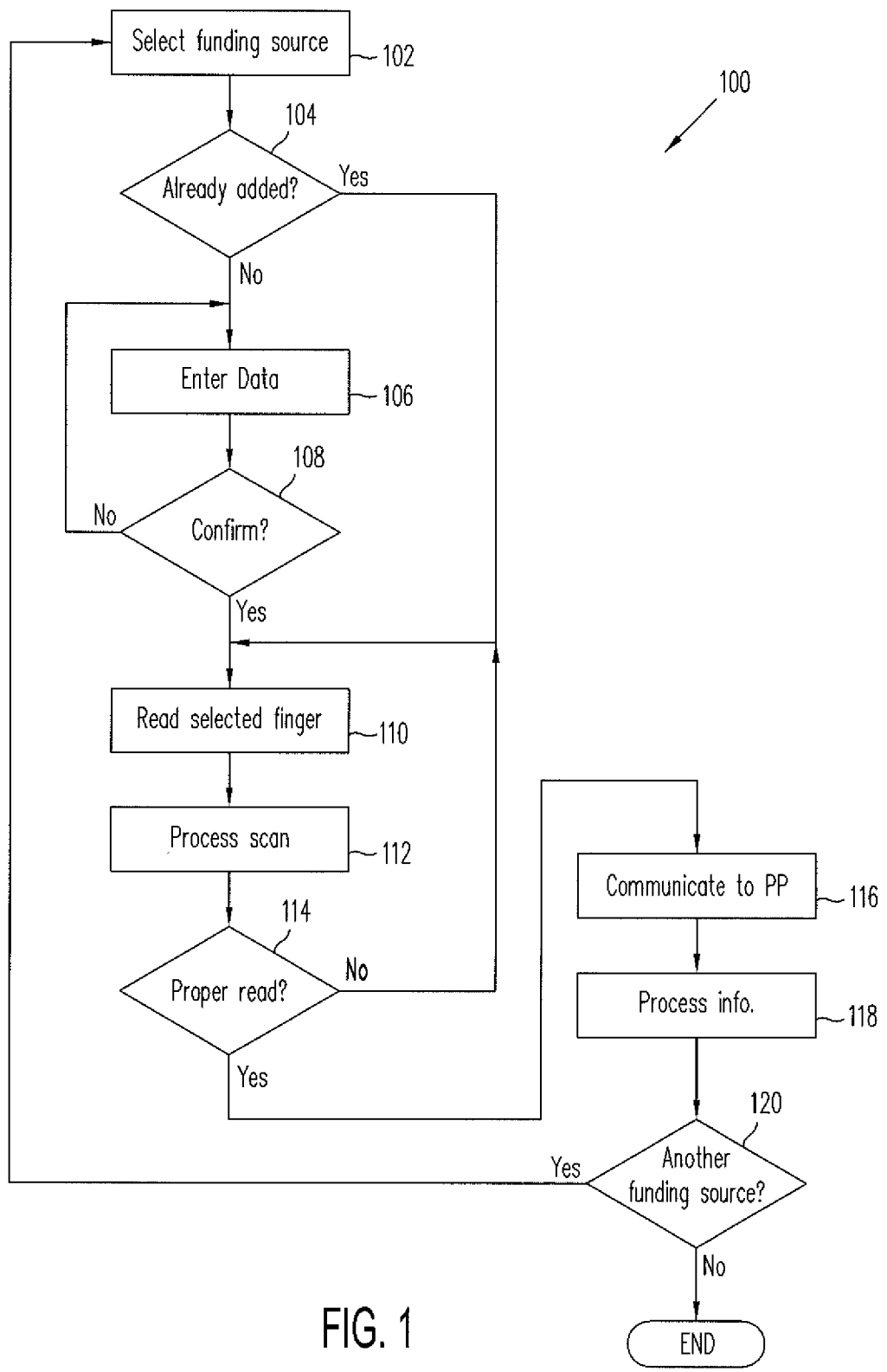
FIG. 1 is a flowchart of a method for registering for a finger print based funding source selection according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart of a method 100 for user registration of finger prints to enable the user to select or change funding sources based on specific fingers, according to one embodiment. At step 102, the user selects a funding source that the user wants to associate with a specific user finger. Funding sources, in one embodiment, is any funding instrument that user can use to make a full or partial payment or transfer. Examples include one or more different credit cards from one or more credit card companies (e.g., Visa, MasterCard, American Express, Discover, etc.), one or more bank or debit cards, one or more gift cards, one or more loyalty/reward points, one or more bank accounts (e.g., savings, checking, money market, etc.), one or more accounts with a third party payment provider, which may include the current payment provider, such as PayPal, Inc. of San Jose, Calif., etc.

If the user has already added the desired funding source, as determined at step 104, the user can select the desired funding source from a list or menu through the user's account with the payment provider. For example, the user can select a button or box next to the desired funding source or tap or otherwise select the desired funding source from a drop-down menu or a display screen.

However, if the desired funding source has not yet been added as an available funding source for the user account with the payment provider, the user will be asked, at step 106, to enter specific information to add the funding source. For example, the user may be asked to enter or select a credit card type, a credit card number, a security code, an expiration date, and a billing address if the user wishes to add a credit card or debit card. If the user wishes to enter a bank account, the user may be asked to enter the bank account number, address, and routing number. If the user wants to enter loyalty or reward points, the user may be asked to enter the account number for the points provider, a user name, and/or password for the reward account.

Once entered, the payment provider processes the information to determine, at step 108, whether the funding source can be confirmed. If the funding source cannot be confirmed, the user may be asked to enter or re-enter data (such as at step 106) or the process may end.

If the funding source can be confirmed or the funding was previously added and confirmed, the user may be asked, at step 110, to have read the finger the user wishes to be associated with the selected funding source. For example, the user may want to use the user's right thumb as the finger to be associated with the most widely used funding source, since it may be easiest to place the right thumb against a user's mobile device screen. For a funding source that the user does not anticipate selecting very often, the user may decide to associate that funding source with the user's left pinkie.

The finger print may be read in any suitable manner. In one embodiment, the user is asked to place the finger on the user device display or a specific portion of the display if the user device is equipped to scan and process a finger print. In another embodiment, the user is asked to place the finger on an attached or stand-along finger print reader that is capable of communication with the payment provider.

Once read or scanned, the finger print information is processed at step 112, which may include whether the finger print was properly or adequately read. An improper read may be due to various factors, including a smudged or dirty screen or interface, the user not pressing the finger long enough or hard enough on the reader, the user moving the finger before reading has been completed, a dirty finger, a faulty reader, etc.

If a determination, at step 114, indicates the finger print was not properly read, the user may be asked to have the finger read again (step 110), which is again processed. If the finger cannot be properly read after a predetermined number of tries, the process may end until the user is ready to try again, such as when the user cleans the finger, cleans the screen, fixes the reader, etc.

When a proper finger print is captured by the reader, the information is communicated, at step 116, to the payment provider. The payment provider processes the information, at step 118, to associate the finger print with the earlier selected funding source. This may include digitizing or otherwise converting the received finger print image to a suitable format and storing the finger print in a database or in a cloud, along with a description of the finger. For example, the user may be asked to select or identify the finger being read, e.g., the right index finger, the left ring finger, the right middle finger, the right thumb, the right pinkie, etc. The user may select or identify the finger type at any desirable stage in the process, such as before reading or after a successful reading. The finger print image may be part of a user account information, where the user account information includes the funding source information.

After processing, the payment provider may ask, at step 120, whether the user wishes to associate another funding source (to be added or already confirmed) with another user finger. If so, the user again selects a desired funding source at step 102. The user can associate a different funding source for each finger. So, typically, a user would be able to associate ten different funding sources to each of a user's ten fingers. However, it is also contemplated that if the user wishes to add more funding sources that fingers, combinations of finger prints can be associated with a funding source. For example, a right thumb-left thumb sequence may correspond to an eleventh funding source. Thus, combinations of two or more fingers (same or different fingers) can be used to increase the number of funding sources available to be used with embodiments described herein.

Once at least one funding source is linked to a user finger print(s), the user can now use this feature to select and/or change funding sources to make a payment through the payment provider.

Figure 2:
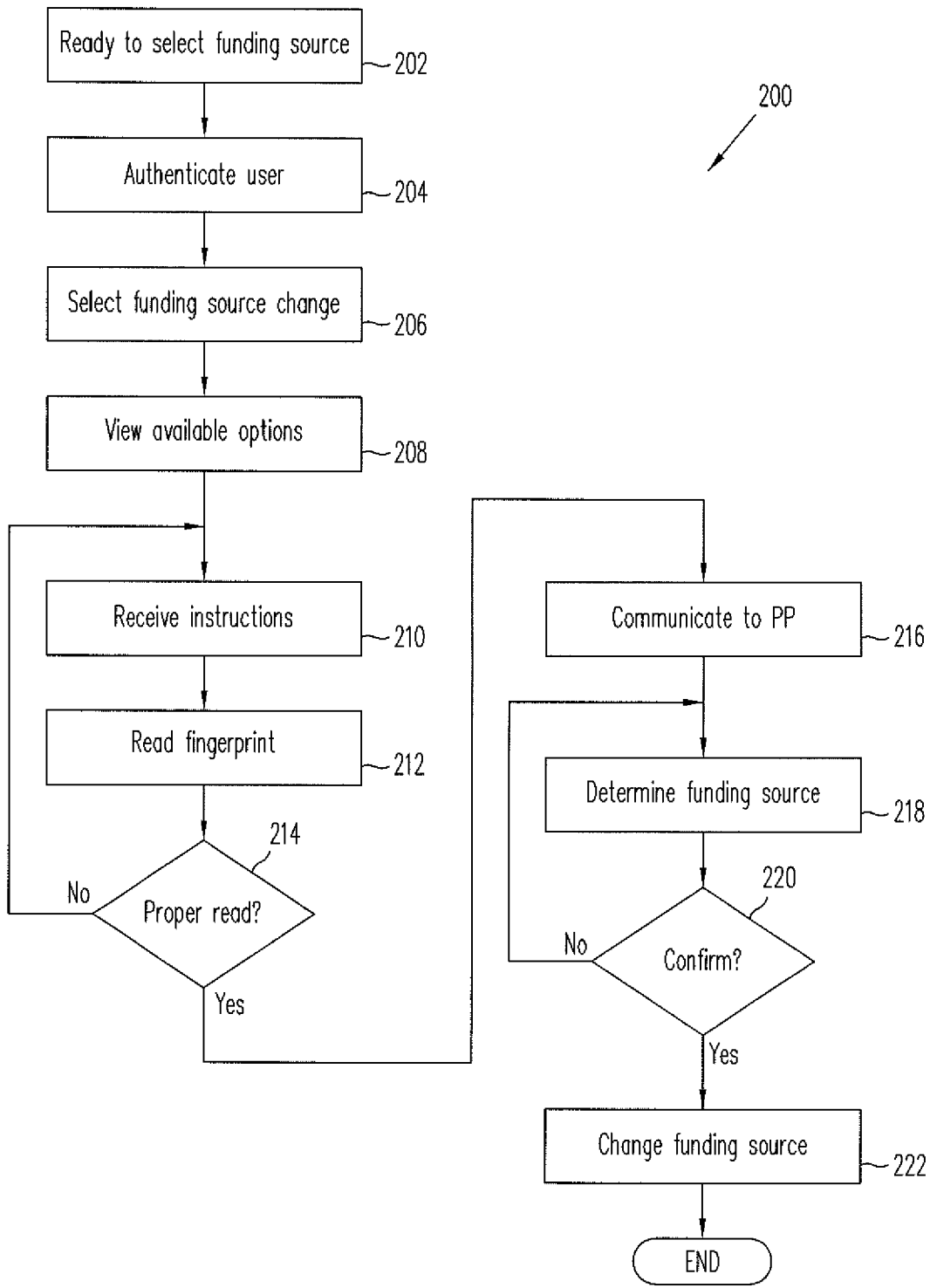
FIG. 2 is a flowchart of a method for processing a user selection of a funding source using a finger print according to one embodiment.

FIG. 2 is a flowchart of a method 200 for processing a user selection of a funding source using a finger print according to one embodiment. At step 202, the user is at a point of a financial transaction or potential financial transaction in which the user can select or change a funding source for making a payment or sending funds. In one example, the user is at point of sale (POS) and is in some stage (e.g., before checkout has started, during checkout, or after a total amount has been obtained) of a financial transaction for making a payment for a purchase using the user's payment provider account. In another example, the user is not involved with or contemplating any specific financial transaction, but instead just wants to change a default funding source.

At step 204, the user is authenticated by the payment provider. This may include the user entering login information, such as a user identifier and a password or PINT. The identifier may be a user name, email address, or mobile phone number. In one example, the user accesses a payment provider app on the user's mobile device or goes to the payment provider website through a mobile browser, where the user can enter the requested authentication information.

Once authenticated, the user selects an option, at step 206, to change a funding source. The selection may depend on the situation for the funding source change. For example, if the user is ready to make a payment (e.g., a total amount has been obtained), the user may see a payment page on the user's mobile device. The payment page may include the total amount and other details of the financial transaction, such as items purchased, merchant information, and tax/shipping costs, along with a funding source. The funding source can be a default funding source previously selected by the user or a funding source suggested by the payment provider. A button or link may be displayed for changing the funding source. As such, the user can select, such as by tapping, the button to indicate a desire to change the funding source.

If the user is not involved in a pending or current financial transaction, the user may indicate the desire to change the funding source by selecting a button, link, or tab from a user account page. For example, the user may see a button on the home page or on a funding source tab that, when selected, indicates a desire to change a funding source.

Optionally, the user may be presented, at step 208, with a list of available funding options, along with a current default funding source if applicable. The list, such as the user mobile device display, may include funding sources that can be selected using a finger print scan. For example, the user may have eleven available and confirmed funding sources, but four that can be selected with a finger print. Of those four, each may have a descriptor of the type of finger print associated with it. A Hilton Visa may have "Right Thumb" associated it, and a Costco American Express may have a "Left Index" associated with it. The descriptors may also be viewable through the user's account at other times, which enables to user to remember which fingers are associated with which funding sources.

With or without a list presented, the user may then receive instructions, at step 210, for changing or selecting the funding source using a user finger. The instructions may be written or by voice and instruct the user as to how the user's finger print can be read and captured. In one embodiment, the user is asked to press and hold the desired finger over a specific area of the mobile device display. The specific area may be active and correspond to a readable area of a finger print reader in the mobile device. Other ways for the user mobile device to read the user's finger print may also be suitable, such as through an external reader.

At step 212, the user performs as instructed to have the desired finger print read. For example, the user may press the right thumb against a specific area on the mobile device display, before or after selecting a button to instruct the device that a finger print scan will be performed. The read or scan is processed to determine, at step 214, whether the finger print was correctly read. An incorrect read or capture may result from a dirty finger, a dirty or damaged screen, the user not holding the finger long enough or pressing hard enough against the reader, the user moving the finger during the scan, etc. If the finger print was not captured properly, the user may be asked again, with instructions at 210, to have the finger print read again. The process may end if the finger print is not properly read after a certain number of tries, which can be one or more. If the process ends, the user may have the option of selecting or changing a funding source using conventional methods, such as manually selecting an available funding source option from a list, pop-up screen, or drop down menu.

A correct read may be determined when enough of the finger print is read to enable a search of the finger print against stored finger prints with the payment provider. Once the desired finger print has been properly read or captured, the information associated with the finger print is communicated to the payment provider at step 216 from the mobile device or finger print reader.

Once received, the payment provider determines whether there is a match of the received finger print information with a finger print associated with a funding source of the user's account. For example, the payment provider may search, using known finger print search and match techniques, a database having the user's account information, including finger print information corresponding to funding sources for the user account. If no matching finger print is found, the payment provider may notify the user, through the user device, that no funding source was found. The user may have the option of having the finger print read again or to select/change the funding source through conventional and known methods.

However, if the received finger print information matches with a stored finger print corresponding to an available funding source, the payment provider determines, at step 218, the funding source associated with the received finger print information. For example, the user may have scanned a right thumb, which the payment provider finds as being associated with the user's checking account.

After locating the funding source, the payment provider may present the funding source to the user via the user device. For example, the user may see something like "You have selected your Citibank checking account ending in 1234." The user may be asked to confirm the selection at step 220. Confirmation may be made by the user selecting a "confirm" or other similar button or link on the mobile device. Other means of accepting, such as voice or text, may also be suitable.

If the presented funding source is incorrect, such as if the user selected the wrong finger for reading, the payment provider can determine the funding source again through the same or different means, such as by user selection by conventional methods.

Once confirmed, the payment provider can change or selected the desired funding source at step 222. The user may be notified of such change, such as on the user mobile device, with a message that the funding source has been successfully changed to funding source X. Note that one or more of the steps described above may be performed in a different order, combined, or omitted as desired.

As a result, the user can quickly and easily select or change a funding source by simply placing a desired finger against the mobile device display (or other means of reading a finger print).

In addition to selecting or changing a funding source, the user may also change or select a funding currency, according to another embodiment. The user may draw a currency symbol on the display of the user device, such as on a designated portion of a display. For example, the user can draw a U.S. dollar sign ($) to choose the transaction be conducted with U.S. dollars or the user can draw an English pound sign (£) to change the current from U.S. dollars to English pounds. Thus, different currency symbols can be drawn and recognized by the system to change a default currency or otherwise selected a desired currency for the payment or funding transaction.

Figure 3:
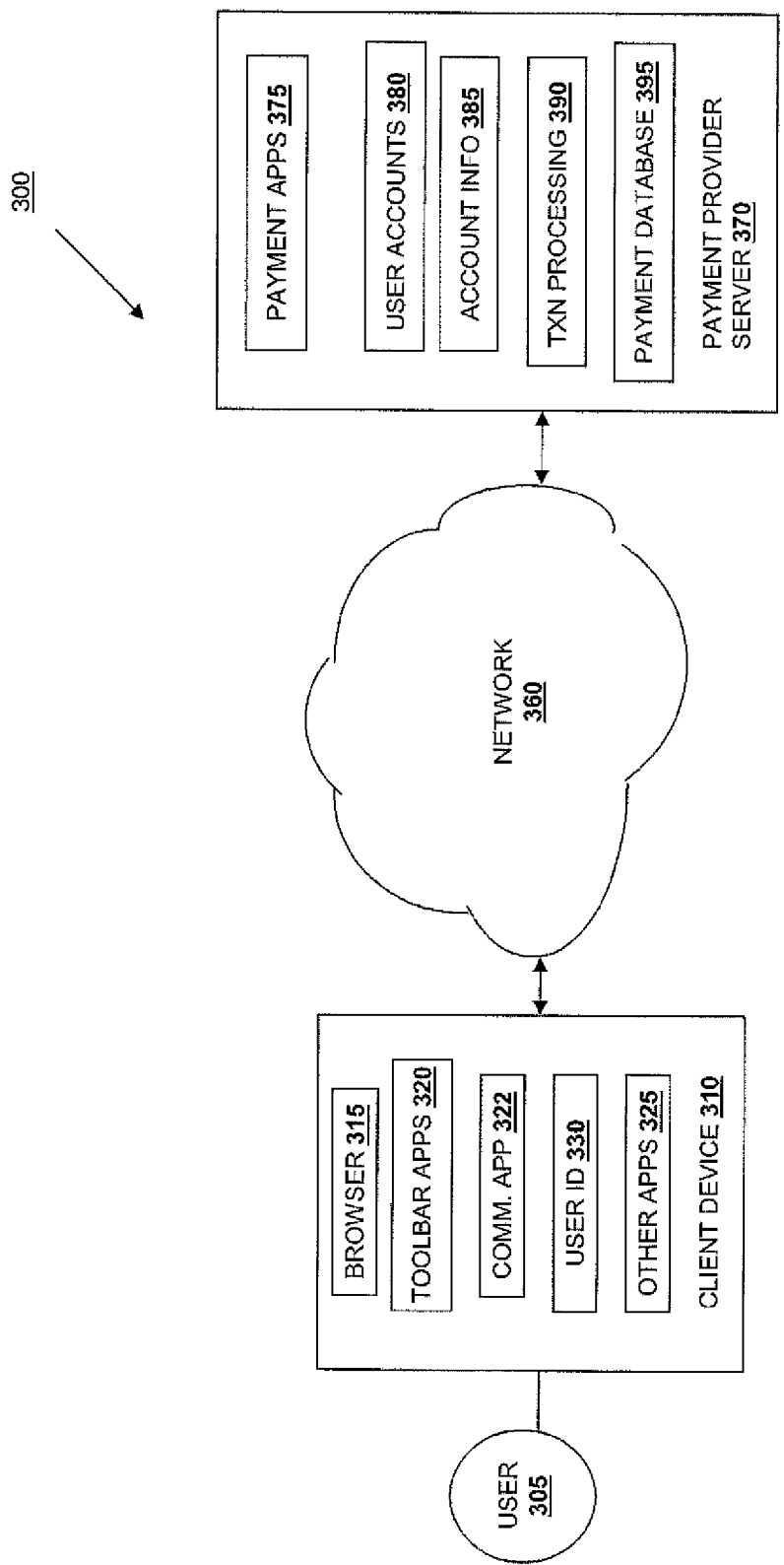
FIG. 3 is block diagram of a networked system suitable for implementing the processes described herein according to an embodiment.

FIG. 3 is a block diagram of a networked system 300 configured to select a funding source for a payment sender (e.g., user or consumer), such as described above, in accordance with an embodiment of the invention. System 300 includes a user device 310 and a payment provider server 370 in communication over a network 360. Payment provider server 370 may be maintained by a payment provider, such as PayPal, Inc. of San Jose, Calif. A user 305, such as the sender or consumer, utilizes user device 310 to perform a payment transaction using payment provider server 370.

User device 310 and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a smart phone, personal digital assistant (PDA), laptop computer, PC, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet or access a website of the payment provider. User device 310 may also include one or more toolbar applications 320 which may be used, for example, to provide client-side processing for performing desired tasks in response to operations selected by user 305. In one embodiment, toolbar application 320 may display a user interface in connection with browser application 315 as further described herein.

User device 310 may further include other applications 325, such as mobile Apps, as may be desired in particular embodiments to provide desired features to user device 310, such as reading, scanning, or otherwise capturing information from a finger print of user 305. For example, other applications 325 may include security applications for implementing client-side security features, programmatic client applications for interfacing with appropriate application programming interfaces (APIs) over network 360, or other types of applications. Applications 325 may also include apps for email, texting, voice and IM applications that allow user 305 to send and receive emails, calls, and texts through network 360, as well as applications or apps that enable the user to communicate, place orders, and make payments through the payment provider.

User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider as further described herein. A communications application 322, with associated interfaces, enables user device 310 to communicate within system 300.

Payment provider server 370 may be maintained, for example, by an online payment service provider which may provide payment services for user 305. In this regard, payment provider server 370 includes one or more payment applications 375 which may be configured to interact with user device 310 over network 360 to facilitate payment or the purchase of goods or services by user 305 of first user device 310.

Payment provider server 370 also maintains a plurality of user accounts 380, each of which may include account information 385 associated with individual users and merchants. For example, account information 385 may include private financial information of users of devices such as account numbers, passwords, device identifiers, user names, phone numbers, funding sources information, such as credit card information, bank information, or reward/loyalty point information, coupon information, gift card information, other financial information, along with finger print information associated with one or more of the funding sources. Payment application 375 may be configured to interact with user device 310 on behalf of user 305 during a transaction or funding source selection or change.

A transaction processing application 390, which may be part of payment application 375 or separate, may be configured to receive information, such as finger print information, from a user device for processing and storage in a payment database 395. Transaction processing application 390 may include one or more applications to process information from user 305 and/or one or more merchants for processing a payment from the user through a user device. Payment application 375 may be further configured to determine the existence of and to manage accounts for user 305, as well as create new accounts if necessary, such as the set up, management, and use of finger print information to select or change funding sources.

Figure 4:
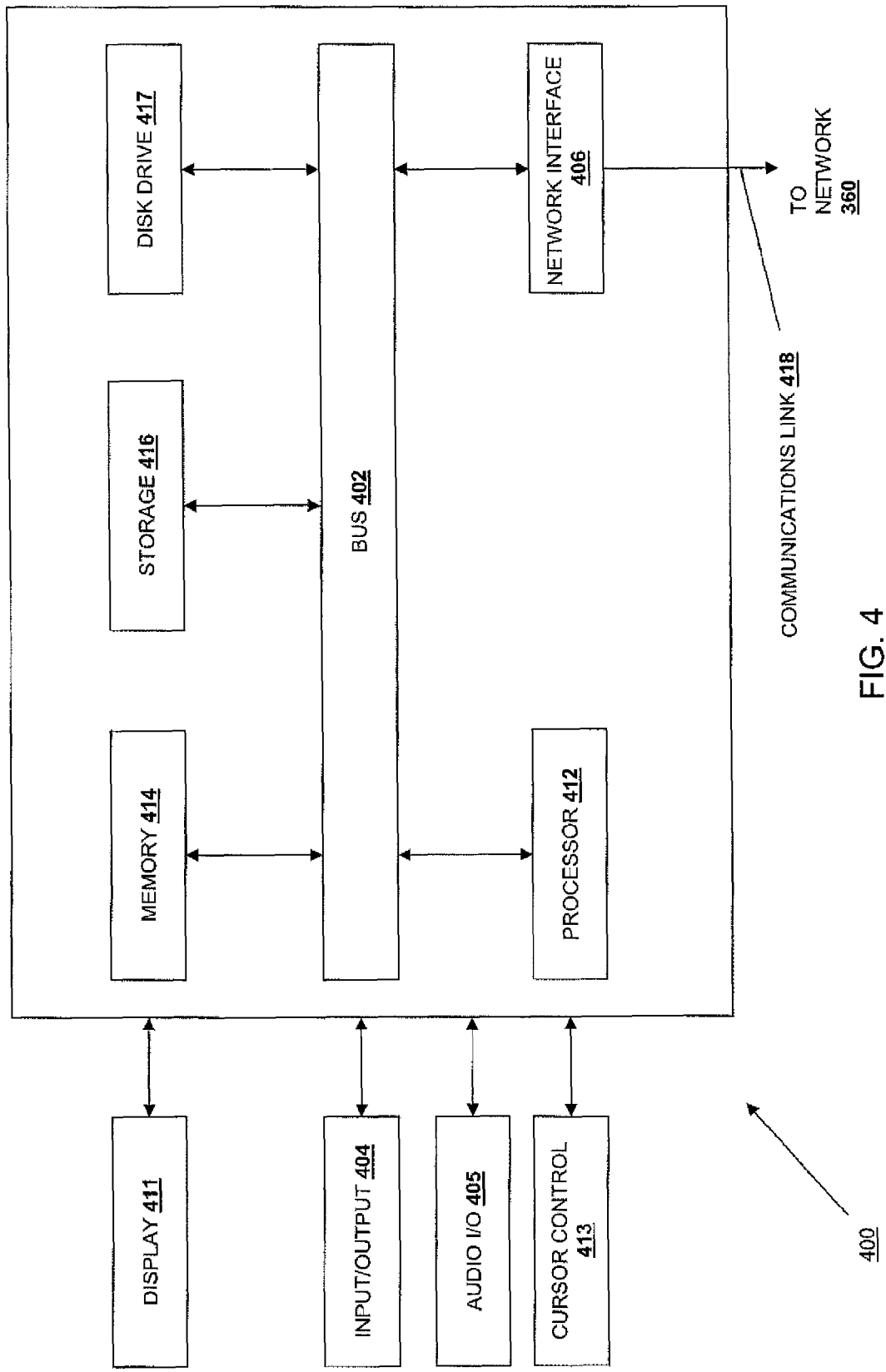
FIG. 4 is a block diagram of a computer system suitable for implementing one or more components in FIG. 3 according to one embodiment of the present disclosure.

FIG. 4 is a block diagram of a computer system 400 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include at least one input/output (I/O) component 404 that processes a user action, such as reading a finger print, selecting keys from a keypad/keyboard or selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system comprising:
a non-transitory memory storing account information for a plurality of users, wherein the account information comprises a user identifier, a plurality of funding sources, and finger print information comprising two or more finger prints and fingerprint descriptors for the two or more finger prints associated with selecting each of the plurality of funding sources; and
one or more hardware processors coupled to the non-transitory memory and configured to execute instructions to cause the system to perform operations comprising:
receiving, by a payment provider servicing an account of a user, authentication information from a mobile device;
accessing and authenticating, by the payment provider, the account associated with the authentication information;
determining the plurality of funding sources available to the account based on the account information;
selecting a subset of the plurality of funding sources based on the subset having the fingerprint descriptors for the subset of the plurality of funding sources, wherein the subset is available for electronic transaction processing via a mobile application using the two or more finger prints;
determining a list comprising the subset of the plurality of funding sources;
causing to be displayed, via the mobile device, a default funding source with the list and the fingerprint descriptors, wherein the list is provided with an interface element comprising an option to change the default funding source based on input associated with one of the fingerprint descriptors, and wherein the list is further displayed without other ones of the plurality of funding sources not having the fingerprint descriptors;
receiving a request to change the default funding source via the option;
requesting from the mobile device, by the payment provider, a selection of one of the plurality of funding sources associated with the account via a reading of two or more finger prints of the user;
providing a portion of a display interface for the reading of the two or more finger prints for electronic transaction processing, wherein the display interface comprises a touch screen interface for the reading of the two or more finger prints, and wherein the portion comprises an active region within a subset of the display interface;
requesting an entry of the two or more finger prints in the portion of the display interface during the electronic transaction processing;
receiving, by the payment provider in response to the request for the selection of one of the plurality of funding sources, a scan of the two or more finger prints at the mobile device associated with a selected funding source, where each of the plurality of funding sources is associated with a respective set of two or more corresponding stored finger prints of the user in the finger print information;

determining, by the payment provider, that the two or more finger prints match one of the respective sets of the two or more corresponding stored finger prints associated with a matched funding source linked to the account;

selecting, by the payment provider, the matched funding source for the user of the mobile device; and requesting, by the payment provider, a confirmation from the mobile device that the matched funding source is intended by the user.

2. The system of claim 1, wherein the operations further comprise:

receiving, by the payment provider in response to the requesting the confirmation, an indication that the selected funding source is incorrect from the user; and selecting, by the payment provider, a different funding source from the one of the plurality of funding sources in response to receiving the indication.

3. The system of claim 1, wherein the operations further comprise adding a new funding source to the plurality of funding sources and a new associated set of two or more finger prints, wherein the new associated set of two or more finger prints is different from each of the two or more finger prints in the finger print information of the user.

4. The system of claim 1, wherein the plurality of funding sources for the account comprise funding sources associated with two or more sets of finger prints of the user.

5. The system of claim 1, wherein the selecting changes the default funding source for the account to the matched funding source for a future transaction.

6. The system of claim 4, wherein the operations further comprise presenting funding source information for the plurality of funding sources with the fingerprint descriptors in the list.

7. The system of claim 1, wherein the funding sources include one or more of a credit card, a debit card, a bank account, or an account with the payment provider.

8. A non-transitory machine-readable medium having stored thereon machine-readable instructions, the instructions executable to cause performance of operations, the operations comprising:

receiving, by a payment provider servicing an account of a user, authentication information from a mobile device;

accessing, by the payment provider, the account associated with the authentication information;

authenticating the user for a use of the account based on the authentication information;

determining a plurality of funding sources for the account;

selecting a subset of the plurality of funding sources based on the subset having fingerprint descriptors for the subset of the plurality of funding sources, wherein the subset is available for electronic transaction processing via a mobile application using two or more finger prints;

determining a list comprising the subset of the plurality of funding sources;

causing to be displayed, via the mobile device, a default funding source with the list and the fingerprint descriptors, wherein the list is provided with an interface element comprising an option to change the default funding source based on an input associated with one of the fingerprint descriptors, and wherein the list is further displayed without other ones of the plurality of funding sources not having the fingerprint descriptors;

receiving a request to change the default funding source via the option;

requesting from the mobile device, by the payment provider, a selection of one of a plurality of funding sources associated with the account via a reading of the two or more finger prints of the user;

providing a portion of a display interface for the reading of the two or more finger prints for electronic transaction processing, wherein the display interface comprises a touch screen interface for the reading of the two or more finger prints, and wherein the portion comprises an active region within a subset of the display interface;

requesting an entry of the two or more finger prints in the portion of the display interface during the electronic transaction processing;

receiving, by the payment provider, a scan of the two or more finger prints at the mobile device associated with a selected funding source, where each of the plurality of funding sources is associated with a respective set of two or more corresponding stored finger prints of the user;

determining, by the payment provider, that the two or more finger prints match one of the respective sets of two or more corresponding stored finger prints associated with a matched funding source linked to the account;

selecting, by the payment provider, the matched funding source for the user of the mobile device; and requesting, by the payment provider, a confirmation from the mobile device that the matched funding source is intended by the user.

9. The non-transitory machine-readable medium of claim 8, wherein the operations further comprise:

receiving, in response to the requesting the confirmation, an indication that the selected funding source is incorrect from the user; and selecting, by the payment provider, a different funding source from the one of the plurality of funding sources in response to receiving the indication.

10. The non-transitory machine-readable medium of claim 8, wherein the operations further comprise adding a new funding source to the plurality of funding sources and a new associated set of two or more finger prints, wherein the new associated set of two or more finger prints is different from each of the two or more corresponding stored finger prints.

11. The non-transitory machine-readable medium of claim 8, wherein the plurality of funding sources for the account comprises funding sources associated with two or more sets of finger prints of the user.

12. The non-transitory machine-readable medium of claim 8, wherein the selecting changes the default funding source for the account to the matched funding source for a future transaction.

13. The non-transitory machine-readable medium of claim 11, wherein the operations further comprise presenting funding source information for the plurality of funding sources with the fingerprint descriptors in the list.

14. The non-transitory machine-readable medium of claim 8, wherein the funding sources include one or more of a credit card, a debit card, a coupon, a gift card, reward points, loyalty points, a checking account, a savings account, a bank account, or an account with the payment provider.

15. A method for performing a payment transaction, comprising:

receiving, electronically by a processor of a payment provider servicing an account of a user, authentication information from a mobile device;

accessing, by the payment provider, the account associated with the authentication information;

authenticating the user for a use of the account based on the authentication information;

determining a plurality of funding sources for the account;

selecting a subset of the plurality of funding sources based on the subset having fingerprint descriptors for the subset of the plurality of funding sources, wherein the subset is available for electronic transaction processing via a mobile application using two or more finger prints;

determining a list comprising the subset of the plurality of funding sources;

causing to be displayed, via the mobile device, a default funding source with the list and the fingerprint descriptors, wherein the list is provided with an interface element comprising an option to change the default funding source based on an input associated with one of the fingerprint descriptors, and wherein the list is further displayed without other ones of the plurality of funding sources not having the fingerprint descriptors;

receiving a request to change the default funding source via the option;

requesting, from the mobile device, by the payment provider, a selection of one of a plurality of funding sources associated with the account via a reading of the two or more finger prints of the user;

providing a portion of a display interface for the reading of the two or more finger prints for electronic transaction processing, wherein the display interface comprises a touch screen interface for the reading of the two or more finger prints, and wherein the portion comprises an active region within a subset of the display interface;

requesting an entry of the two or more finger prints in the portion of the display interface during the electronic transaction processing;

receiving, electronically by the processor of the payment provider, a scan of the two or more finger prints from the mobile device associated with a selected funding source, where each of the plurality of funding sources is associated with a respective set of two or more corresponding stored finger prints of the user;

determining, by the processor of the payment provider, that the two or more finger prints match one of the respective sets of the two or more corresponding stored finger prints associated with a matched funding source linked to the account;

selecting, by the payment provider, the matched funding source for the user of the mobile device; and requesting, by the payment provider, a confirmation from the mobile device that the matched funding source is intended by the user.

16. The method of claim 15, further comprising:

receiving, by the payment provider in response to the requesting the confirmation, an indication that the selected funding source is incorrect from the user; and selecting, by the payment provider, a different funding source from the one of the plurality of funding sources in response to receiving the indication.

17. The system of claim 1, wherein the authentication information is user login information.

18. The non-transitory machine-readable medium of claim 8, wherein the authentication information is user login information.

19. The method of claim 15, wherein the authentication information is user login information.

20. The system of claim 1, wherein the operations further comprise:

receiving, by the payment provider, a selection of a funding source currency in response to a currency symbol being drawn on a display of the mobile device.

21. The method of claim 15, further comprising:

receiving, by the payment provider, a selection of a funding source currency in response to a currency symbol being drawn on a display of the mobile device.

* * * * *